US010642036B2

United States Patent
Wall

(10) Patent No.: US 10,642,036 B2
(45) Date of Patent: May 5, 2020

(54) HOUSING FOR A HEAD-UP DISPLAY OF A MOTOR VEHICLE AND METHOD FOR PROVIDING A HOUSING FOR A HEAD-UP DISPLAY

(71) Applicant: Audi AG, Ingolstadt (DE)

(72) Inventor: Christian Wall, Hitzhofen (DE)

(73) Assignee: Audi AG, Ingolstadt (DE)

( * ) Notice: Subject to any disclaimer, the term of this patent is extended or adjusted under 35 U.S.C. 154(b) by 0 days.

(21) Appl. No.: 15/519,303

(22) PCT Filed: Sep. 3, 2015

(86) PCT No.: PCT/EP2015/001774
§ 371 (c)(1),
(2) Date: Apr. 14, 2017

(87) PCT Pub. No.: WO2016/058658
PCT Pub. Date: Apr. 21, 2016

(65) Prior Publication Data
US 2017/0235141 A1 Aug. 17, 2017

(30) Foreign Application Priority Data
Oct. 17, 2014 (DE) ........................ 10 2014 015 378

(51) Int. Cl.
*G02B 27/10* (2006.01)
*G02B 27/14* (2006.01)
(Continued)

(52) U.S. Cl.
CPC .......... *G02B 27/0149* (2013.01); *B60K 35/00* (2013.01); *B60K 37/04* (2013.01);
(Continued)

(58) Field of Classification Search
CPC .......... G02B 27/0101; G02B 2027/015; G02B 27/0149; G02B 2027/0161; G02B 7/182;
(Continued)

(56) References Cited

U.S. PATENT DOCUMENTS

| 4,082,432 A | 4/1978 | Kirschner |
| 4,611,877 A | 9/1986 | Ellis |

(Continued)

FOREIGN PATENT DOCUMENTS

| CA | 1090176 A | 11/1980 |
| CN | 1629930 A | 6/2005 |

(Continued)

OTHER PUBLICATIONS

English-language abstract of German Patent Application Publication No. 10 2007 010 381 A1, published Sep. 11, 2008; 1 page.

(Continued)

*Primary Examiner* — Brandi N Thomas
(74) *Attorney, Agent, or Firm* — Sterne, Kessler, Goldstein & Fox P.L.L.C.

(57) ABSTRACT

The invention relates to a housing for a head-up display of a motor vehicle, which housing has an inner wall that at least partially delimits an internal space for an imaging projection device to project a virtual image in a beam path onto a reflection surface in an internal space of the motor vehicle. The housing is characterized by at least one reflective deflection region of the internal wall to deflect the beam path of the imaging projection device. The deflection region may have a metallized or metallizing layer which is formed via the application of a metallizing, amorphous substance or material onto a surface of a base body of the inner wall, said surface facing toward the internal space. The invention furthermore relates to a corresponding head-up display, a (Continued)

correspondingly embodied motor vehicle, and a method to provide a housing according to the invention.

18 Claims, 2 Drawing Sheets

(51) Int. Cl.
*G02B 27/01* (2006.01)
*B60K 37/04* (2006.01)
*B60K 35/00* (2006.01)
*C23C 30/00* (2006.01)
*G02B 7/182* (2006.01)

(52) U.S. Cl.
CPC .......... *C23C 30/00* (2013.01); *G02B 27/0101* (2013.01); *B60K 2370/152* (2019.05); *B60K 2370/155* (2019.05); *B60K 2370/1529* (2019.05); *B60K 2370/334* (2019.05); *B60K 2370/691* (2019.05); *B60K 2370/77* (2019.05); *B60K 2370/81* (2019.05); *G02B 7/182* (2013.01); *G02B 2027/015* (2013.01); *G02B 2027/0161* (2013.01)

(58) Field of Classification Search
CPC .......... G02B 26/105; G02B 2027/0105; G02B 2027/0159; G02B 2027/0181; G02B 2027/0198; G02B 27/0103; G02B 2027/011; G02B 2027/0121; G02B 2027/0127; G02B 2027/013
USPC ......... 359/619–631, 811, 813, 815, 819–822
See application file for complete search history.

(56) References Cited

U.S. PATENT DOCUMENTS

| 7,301,699 | B2 | 11/2007 | Kanamori et al. |
|---|---|---|---|
| 2004/0113866 | A1 | 6/2004 | Aoki et al. |
| 2005/0039267 | A1 | 2/2005 | Kvita et al. |
| 2005/0154505 | A1 | 7/2005 | Nakamura et al. |
| 2005/0162738 | A1 | 7/2005 | Kanamori et al. |
| 2005/0259034 | A1* | 11/2005 | Harada .............. G02B 27/0101 345/7 |
| 2006/0290913 | A1* | 12/2006 | Dieckmann ......... G03F 7/70308 355/53 |
| 2007/0252989 | A1* | 11/2007 | Comstock .............. G01J 3/02 356/328 |
| 2011/0267700 | A1* | 11/2011 | Schliep .............. G02B 27/0101 359/630 |
| 2011/0267702 | A1* | 11/2011 | Fujimoto ............ G02B 27/0101 359/633 |
| 2013/0076791 | A1 | 3/2013 | Moussa et al. |
| 2013/0208363 | A1* | 8/2013 | Masuda ............. G02B 27/0101 359/630 |

FOREIGN PATENT DOCUMENTS

| CN | 101231391 A | 7/2008 |
|---|---|---|
| CN | 100412509 C | 8/2008 |
| CN | 103026284 A | 4/2013 |
| CN | 103241177 A | 8/2013 |
| DE | 2747760 A1 | 6/1978 |
| DE | 10346884 A1 | 5/2004 |
| DE | 10344271 A1 | 4/2005 |
| DE | 102004044145 B3 | 4/2006 |
| DE | 102007010381 A1 | 9/2008 |
| DE | 102013202185 A1 | 8/2013 |
| EP | 2407337 A1 | 1/2012 |
| GB | 2163869 A | 3/1986 |
| WO | WO 2009105847 A2 | 9/2009 |

OTHER PUBLICATIONS

English-language abstract of German Patent Application Publication No. 103 44 271 A1, published Apr. 21, 2005; 1 page.
International Search Report and Written Opinion of the International Searching Authority directed to related International Patent Application No. PCT/EP2015/001774, dated Nov. 23, 2015, with attached English-language translation; 23 pages.
International Preliminary Report on Patentability directed to related International Patent Application No. PCT/EP2015/001774, dated Feb. 7, 2017, with attached English-language translation; 11 pages.

\* cited by examiner

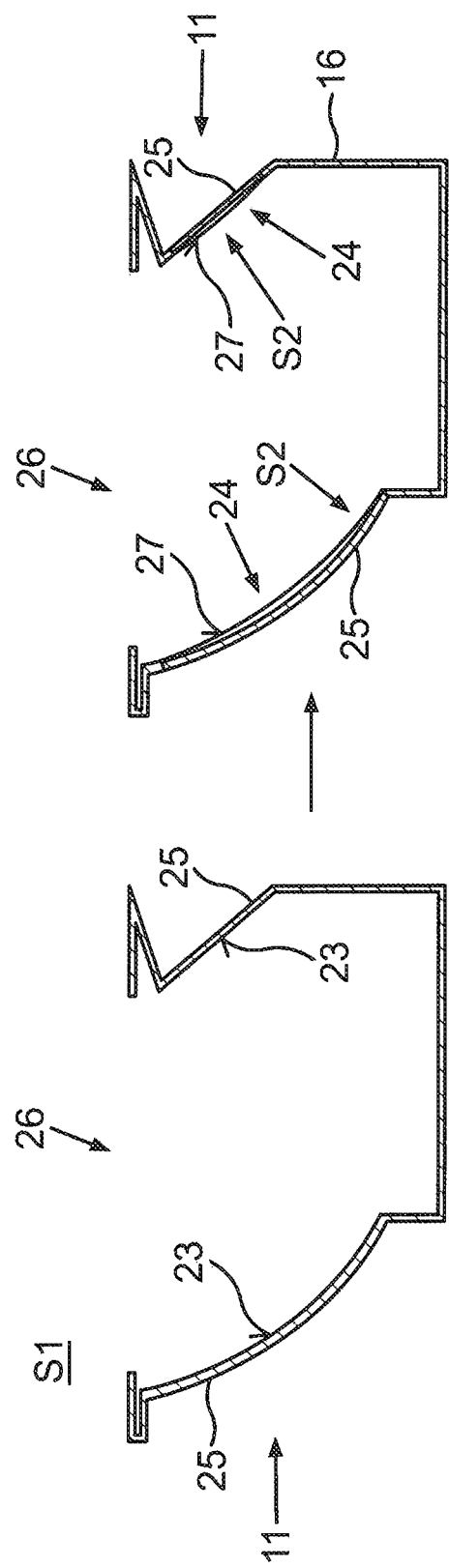

HOUSING FOR A HEAD-UP DISPLAY OF A MOTOR VEHICLE AND METHOD FOR PROVIDING A HOUSING FOR A HEAD-UP DISPLAY

TECHNICAL FIELD

The invention relates to a housing for a head-up display of a motor vehicle, which housing has an inner wall that at least partially delimits an internal space for an imaging projection device to project a virtual image in a beam path onto a reflection surface in an internal space of the motor vehicle.

BACKGROUND

Head-up displays are ever more frequently installed in modern motor vehicles, thus display devices having an imaging projection device to project a virtual image, thus a graphical information, in a beam path onto a reflection surface in an internal space of the motor vehicle (normally onto a windshield).

The head-up display is thereby often positioned in an installation space in front of the driver. The head-up display is comprised of a plurality of individual mechanical, optical and electronic components. In order to deflect the virtual image of the imaging projection device out of the internal space of a housing onto the reflection surface, mirrors are installed within the housing, which mirrors must be adjusted depending on a vehicle type and a windshield variant.

From DE 27 47 760, an optical display device is known that uses an acrylic block as a collimation mirror. A head-up display that uses a wedge-shaped glass body to deflect light of a projector is known from GB 2 163 869 A. The glass body is thereby arranged within a housing in which a projector is also mounted. US 2005/0259034 A1 describes an additional head-up display that has two flat mirrors installed within the housing.

However, the manufacturing and installation of the internal mirrors especially is very complicated and must take place while complying with tight tolerances. The attachment of mirrors in the housing incurs a high installation expenditure, additional. weight and costs due to the installation of additional retainers. The high installation expenditure is predominantly due to the fact that the mounting of the mirror must be adjusted exactly to the corresponding vehicle model in order to direct a projection of a digital display content onto the windshield. Given too high a load on the mirror mounts due to shaking, the mirrors begin to vibrate, whereby their optical quality degrades.

BRIEF DESCRIPTION OF THE DRAWINGS/FIGURES

FIG. 2 illustrates a schematic drawing of an embodiment of method according to the invention.

DETAILED DESCRIPTION

Figure 1:
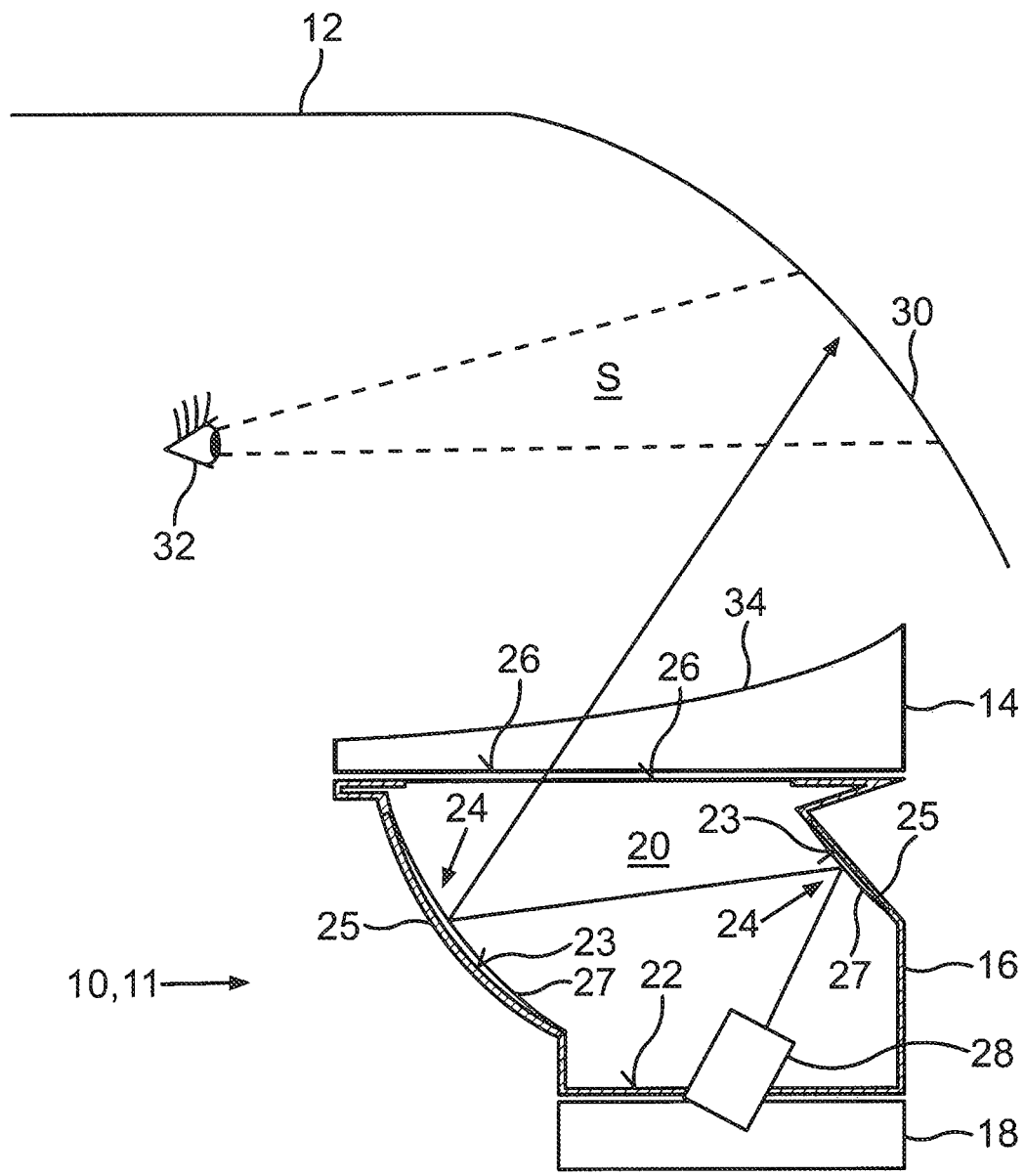
FIG. 1 illustrates a schematic drawing of an embodiment of the housing according to the invention, an embodiment of the head-up display according to the invention, and an embodiment of the automobile according to the invention.

One object forming the basis of the invention is the provision of a head-up display that is less susceptible and less complex to install.

The object is respectively achieved, according to the independent patent claims, by: the housing according to the invention for a head-up display; the head-up display according to the invention; the automobile according to the invention; and the method according to the invention. Advantageous developments of the invention are provided by the dependent claims.

The invention is based on the idea to provide a housing instead of an installable mirror arrangement, which housing has at least one deflection region of an internal wall. With the housing, a robust module that is adapted to the vehicle model is thereby already provided for the deflection of a beam path of an imaging projection device, which module may additionally also be retrofitted quickly with the imaging projection device.

The housing according to the invention for a head-up display of a motor vehicle has an inner wall that at least partially delimits an internal space for an imaging projection device to project a virtual image in a beam path onto a reflection surface in an internal space of the motor vehicle, for example onto a windshield. The housing is thereby characterized by at least one reflective deflection region of the internal wall to deflect the beam path of the imaging projection device (28). This may be understood such that the internal wall has a reflective deflection region.

A head-up display is thereby a display device that projects a digital graphical information, thus a virtual image, onto the reflection surface in the field of view of a user, such that a user may maintain his head posture and viewing direction.

The housing according to the invention is robust and may nearly entirely withstand shaking or inherent vibrations, for example given a drive over a cobblestone. The installation or uninstallation of the housing is very simple to perform and very cost-effective. A complex installation of numerous individual components is foregone, which also entails a weight reduction and a reduction of the required structural space. An attachment of separate mirrors is also foregone.

In order to especially effectively counteract a vibration of the reflective region, the metallized substance (thus the reflective material) is preferably coated in the process of manufacturing the housing, for example via deposition, for example chemical deposition, sputtering or vapor deposition. According to an especially preferred embodiment of the housing according to the invention, the deflection region has a metallized or metallizing layer which is formed via the application of a metallizing, amorphous substance or material on a surface of a base body of the inner wall, said surface facing toward the internal space. The deflection region preferably thereby has a metallized layer in order to achieve the cited advantages.

What is to be understood by this is that the metallized or metallizing layer (thus the mirror itself) is first created via application of the amorphous metallizing substance or material. In the deflection region, the inner wall of the housing is thus formed from the base body with the amorphous metallizing substance or material. In other words, the amorphous metallizing substance is integrally formed to the inner wall "in one piece". An amorphous substance is thereby, for example, a liquid substance, gaseous substance, a substance present in solution, or a substance present as a powder. A reduced complexity and an increased robustness of the deflection region thereby results, as well as a reduction of the required structural space in the motor vehicle.

In order to take up a smaller structural space for the housing in the motor vehicle, the housing may be characterized by at least two deflection regions of the inner wall.

Alternative possibilities are hereby available for an attachment of the projection device.

According to a particularly advantageous embodiment of the housing, the at least one deflection region and a partial region of the inner wall having a passage region may be situated at a predetermined angle relative to one another, wherein the predetermined angle provides a projection path to guide the beam path through the passage region. A precisely aligned projection path to the reflection surface is hereby provided.

The at least one deflection region may exhibit a curvature, thus may be convex or concave in shape. This embodiment enables the deflection device to be adapted to a vehicle-specific curvature and/or a vehicle-specific manufacturing tolerance of a windshield variant of the motor vehicle.

The housing is advantageously comprised at least in part of a plastic, preferably of acrylic glass, polystyrene, polycarbonate, Dibond or Plexiglas. In other words, the housing is preferably made at least in part of acrylic glass, polystyrene, polycarbonate, or Plexiglas, thus preferably has one of these plastics. Given corresponding manufacturing, an inner wall formed from such a plastic may exhibit nearly no smearing and is especially low-distortion.

The object posed above is likewise achieved via a head-up display according to the invention that comprises a housing, of one of the embodiments described above. The head-up display according to the invention may additionally comprise a projection device and/or, in a combiner variant, a combiner screen ("combiner of information"). The aforementioned advantages result, and no separate mirrors are required.

The object posed above is likewise achieved via a motor vehicle according to the invention that comprises a head-up display and/or a housing of one of the embodiments described above. The automobile is thereby preferably a passenger motor vehicle. The aforementioned advantages also result here.

The object posed above is likewise achieved via a method according to the invention to provide a housing for a head-up display. In a first step, a base body of the inner wall made of a base material is provided. This takes place by molding the housing with at least one region of an inner wall of the housing having a surface facing toward the internal space, wherein the surface of the base body or a region of the surface of the base body has a predetermined angle relative to a partial region of the inner wall having a passage region, such that the predetermined angle provides a projection path to guide the beam path through the passage region. A metallization of the surface of the base body that faces toward the internal space takes place by applying a metallizing, amorphous substance or material onto the surface of the base body that faces toward the internal space. The metallization preferably includes a deposition, chemical deposition, vapor deposition or sputtering of the metallizing, amorphous substance. The aforementioned advantages hereby result.

The invention is explained again in detail via concrete exemplary embodiments, using the attached drawings. The shown examples represent preferred embodiments of the invention. Functionally identical elements have the same reference characters in the Figures. Shown are:

FIG. 1 a schematic drawing of an embodiment of the housing according to the invention, an embodiment of the head-up display according to the invention, and an embodiment of the automobile according to the invention, and FIG. 2 a schematic drawing of an embodiment of method according to the invention.

FIG. 1 shows a head-up display 10 of a motor vehicle 12 (an automobile 12, for example), for example a passenger automobile, having a housing 11 and a projection device 28. The housing 11 of the head-up display 10 may, for example, comprise an upper housing part 14, a lower housing part 16, and—for example—a cooling body 18. An internal space 20 of the housing 11 of the head-up display 10 is thereby delimited at least in part by an inner wall 22. A projection device 28, for example a projector, may be arranged in the internal space 20.

The inner wall 22 comprises at least one reflective deflection region 24, for example two reflective deflection regions 24 in FIG. 1, that are situated at opposite regions of the inner wall 22, for example. The at least one deflection region 24 thereby has a metallizing substance, thus a reflective material, that is preferably designed as a layer (27) of the inner wall 22. Silver, aluminum or gold as the preferred metallizing substance enable a long-term stability of the deflection device 24.

In the at least one deflection region 24, a surface 23 of a base body 25 of the inner wall 22, said surface 23 facing toward the internal space 20, preferably has a very precisely machined, smooth surface 23 that is suitable for a metallization. The surface 23 of the base body 25, said surface 23 facing toward the internal space 20, may—with the amorphous metallizing substance—form the metallized layer 27 after its application onto the surface 23. In other words, the metallization is formed directly via the specially shaped housing 11.

The at least one deflection region 24 may be curved, thus convex or concave in shape, wherein the curvature may exhibit curvature angles of different shapes. The at least one deflection region 24 may preferably be arranged at a predetermined angle relative to a partial region 26 of the inner wall 22 having a passage region. Due to the predetermined angle, a projection path P may be provided for a beam path of the virtual image projected from the imaging projection device 28, such that the projection path P directs the light through the passage region 26. The angle may be identified by a person skilled in the art with suitable mathematical calculation programs, and therefore may be predetermined. If the beam path along the projection path P passes through the passage region 26, it strikes a reflection surface 30 of the internal space of the motor vehicle, for example on a windshield or a combiner pane, wherein a combiner pane comprises a light-permeable pane ("combiner of information," "combiner"). An example of a separate combiner pane simplifies the head-up display via a simplified geometry of the deflection device 24, wherein a retrofitting of a housing present in a structural space with a projection device 28 and/or with a light-permeable pane is greatly facilitated.

An example of a screen 34 that is shown in FIG. 1 may shield the user from the beam path. It is shown in FIG. 1 that a user 32 views the virtual image displayed in such a manner in his field of view S. In molding the housing, the angle may be predetermined so that a curvature of the reflection surface 30 is taken into account, which curvature is dependent on a variant of the reflection surface 30, for example.

FIG. 2 shows an exemplary embodiment of a method according to the invention for providing a housing 11 for a head-up display 10. The housing 11 may preferably be formed via an injection molding method. The housing 11 may thereby preferably be formed so that the surface 23 of the base body 25 is at a predetermined angle relative to a passage region 26 and/or relative to an optional retention device (not shown in. FIG. 1) for the imaging projection device 28. A preferred base material of the housing 11, and therefore of the base body 25, is thereby preferably a plastic made of acrylic glass, polystyrene, polycarbonate or Plexiglas, for example. The passage region 26 comprises, for example, a partial region 26 of the inner wall that has an at least partially transparent material and/or a passage opening.

The metallizing substance may preferably be arranged on the surface 23 of the base body 25 that faces toward the internal space 20, via a coating method known to the person skilled in the art—for example via deposition, for example chemical deposition, vapor deposition or sputtering—and thus, with the surface 23 of the base body 25, may form the metallized or metallizing layer 27. The metallized or metallizing layer 27 may alternatively or additionally be applied onto the base material with a plasma ion-assisted coating method, for example.

The housing 11 may preferably be arranged in a structural space of the motor vehicle 12, preferably in a structural space above the instrument panel. The housing 11 may preferably be thinly anchored in the structural space in order to avoid self-vibrations during an operation of the motor vehicle 12.

The exemplary embodiment shown above illustrates the principle of a head-up display 10 whose housing 11 is provided directly as a specially formed and metallized housing 11 instead of as separate parts (for example two internal mirrors). In other words, the optical path is formed directly via the specially shaped housing 11. A suitable material that may supply the necessary precision for the optical quality of the exemplary mirror may thereby preferably be selected for the housing 11. For example, after an injection molding process, the base body 25 of the at least one deflection region 24, for example the respective base body 25 of two deflection regions 24 or two optically active surfaces as surfaces 23, may be metallized in a coating process, for example.

Among other things, the advantages of the reduction of a number of individual parts of the head-up display 10, a simple installation and/or uninstallation of the entire unit, a weight reduction and a cost reduction result.

The invention claimed is:

1. A head-up display of a motor vehicle, comprising:
 a housing comprising:
   an inner wall that at least partially delimits an internal space for an imaging projection device to project a virtual image in a beam path onto a reflection surface in an internal space of the motor vehicle, and
   a reflective deflection region of the inner wall to deflect the beam path of the imaging projection device,
   wherein the reflective deflection region comprises a metallized or metallizing layer that is formed via the application of a metallizing, amorphous substance or material onto a surface of a base body of the inner wall, and
   wherein the surface of the base body of the inner wall faces toward the internal space and forms at least two reflective deflection regions of the inner wall with fixed angles.

2. The head-up display of claim 1, wherein the reflective deflection region and a partial region of the inner wall comprising a passage region are situated at a predetermined angle relative to each other, wherein the predetermined angle provides a projection path to guide the beam path through the passage region.

3. The head-up display of claim 1, wherein the reflective deflection region exhibits a curvature.

4. The head-up display of claim 1, wherein the housing is comprised at least in part of an acrylic glass, a polystyrene, a polycarbonate, or a Plexiglas.

5. A motor vehicle comprising:
 a housing of a head-up display, comprising:
   an inner wall that at least partially delimits an internal space for an imaging projection device to project a virtual image in a beam path onto a reflection surface in an internal space of the motor vehicle, and
   a reflective deflection region of the inner wall to deflect the beam path of the imaging projection device,
   wherein the reflective deflection region comprises a metallized or metallizing layer that is formed via the application of a metallizing, amorphous substance or material onto a surface of a base body of the inner wall, and
   wherein the surface of the base body of the inner wall faces toward the internal space and forms at least two reflective deflection regions of the inner wall with fixed angles.

6. The motor vehicle of claim 5, wherein the reflective deflection region and a partial region of the inner wall comprising a passage region are situated at a predetermined angle relative to each other, wherein the predetermined angle provides a projection path to guide the beam path through the passage region.

7. The motor vehicle of claim 5, wherein the reflective deflection region exhibits a curvature.

8. The motor vehicle of claim 5, wherein the housing is comprised at least in part of an acrylic glass, a polystyrene, a polycarbonate, or a Plexiglas.

9. A method to provide a head-up display, comprising:
 providing a base body of an inner wall of a housing with a surface facing toward an internal space by forming the housing from a base material, wherein the surface of the base body has a predetermined angle relative to a partial region of the inner wall comprising a passage region such that the predetermined angle provides a projection path to guide a beam path through the passage region; and
 forming two reflective deflection regions with fixed angles via metallization out of the surface of the base body of the inner wall that faces toward the internal space via application of a metallizing, amorphous substance or material onto the surface of the base body of the inner wall that faces toward the internal space.

10. The method of claim 9, wherein the metallization of the surface of the base body of the inner wall comprises a deposition, vapor deposition, or sputtering of the metallizing, amorphous substance or material.

11. The method of claim 9, wherein the housing is comprised at least in part of an acrylic glass, a polystyrene, a polycarbonate, or a Plexiglas.

12. The head-up display of claim 1, wherein the at least two reflective deflection regions are situated at opposite regions of the inner wall.

13. The motor vehicle of claim 5, wherein the at least two reflective deflection regions are situated at opposite regions of the inner wall.

14. The head-up display of claim 1, wherein the housing and the at least two reflective deflection regions of the inner wall are formed from a single piece of material.

15. The head-up display of claim 14, wherein the housing and the at least two reflective deflection regions of the inner wall are formed using an injection molding method.

16. The head-up display of claim 1, further comprising:
a screen attached to the housing, wherein the screen is configured to shield a user from the beam path, and
wherein the housing is arranged in a structural space above an instrument panel of the motor vehicle, and the housing is anchored in the structural space to avoid self-vibrations during operation of the motor vehicle.

17. The motor vehicle of claim 5, further comprising:
a screen attached to the housing, wherein the screen is configured to shield a user from the beam path, and
wherein the housing is arranged in a structural space above an instrument panel of the motor vehicle, and the housing is anchored in the structural space to avoid self-vibrations during operation of the motor vehicle.

18. The method of claim 9, further comprising:
shielding, using a screen attached to the housing, a user from the beam path; and
anchoring the housing in a structural space above an instrument panel of the motor vehicle in order to avoid self-vibrations during operation of the motor vehicle.

\* \* \* \* \*